Sept. 25, 1951 S. D. POOL ET AL 2,569,193
ADJUSTABLE SHAFT MOUNTING MEANS
Filed May 31, 1946 2 Sheets-Sheet 1
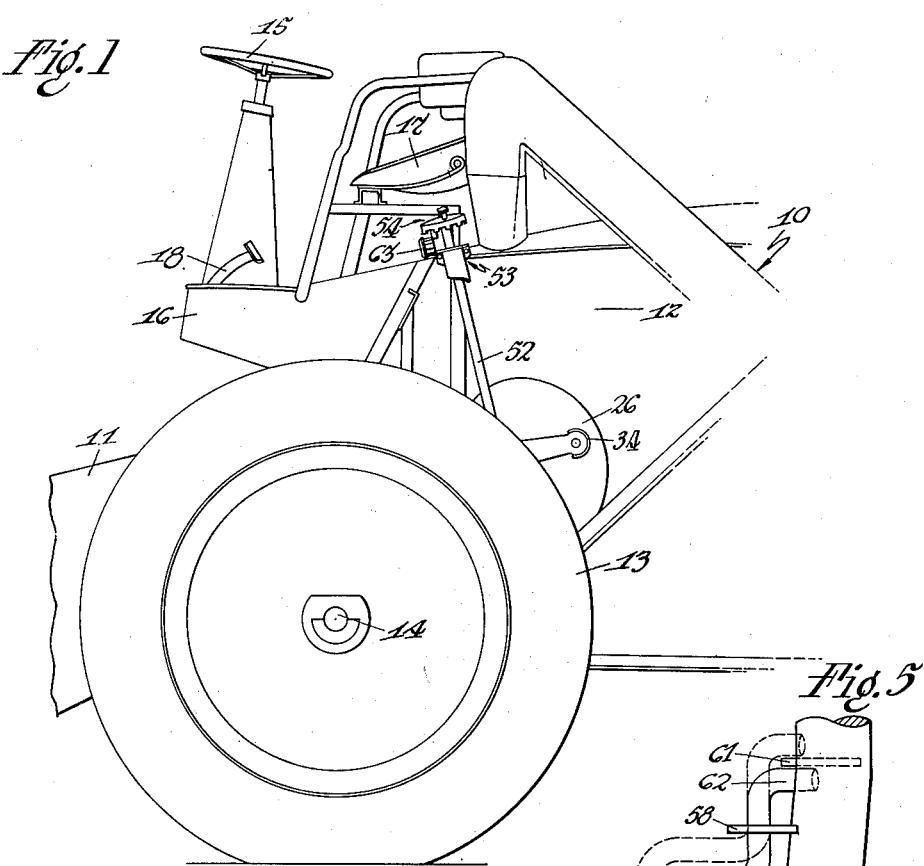
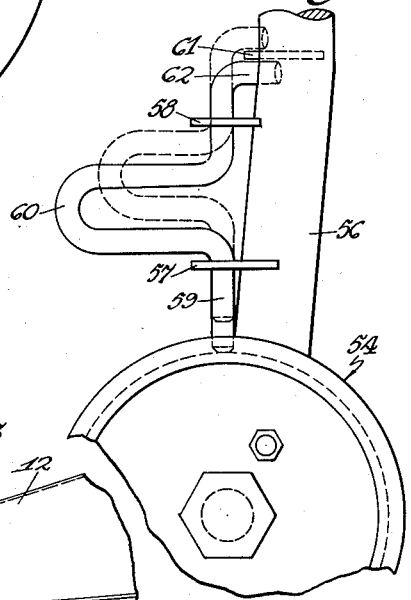
Inventors
Stuart D. Pool
Clinton D. Prosser
By Paul O. Pippel
Atty.

Sept. 25, 1951  S. D. POOL ET AL  2,569,193
ADJUSTABLE SHAFT MOUNTING MEANS
Filed May 31, 1946  2 Sheets-Sheet 2
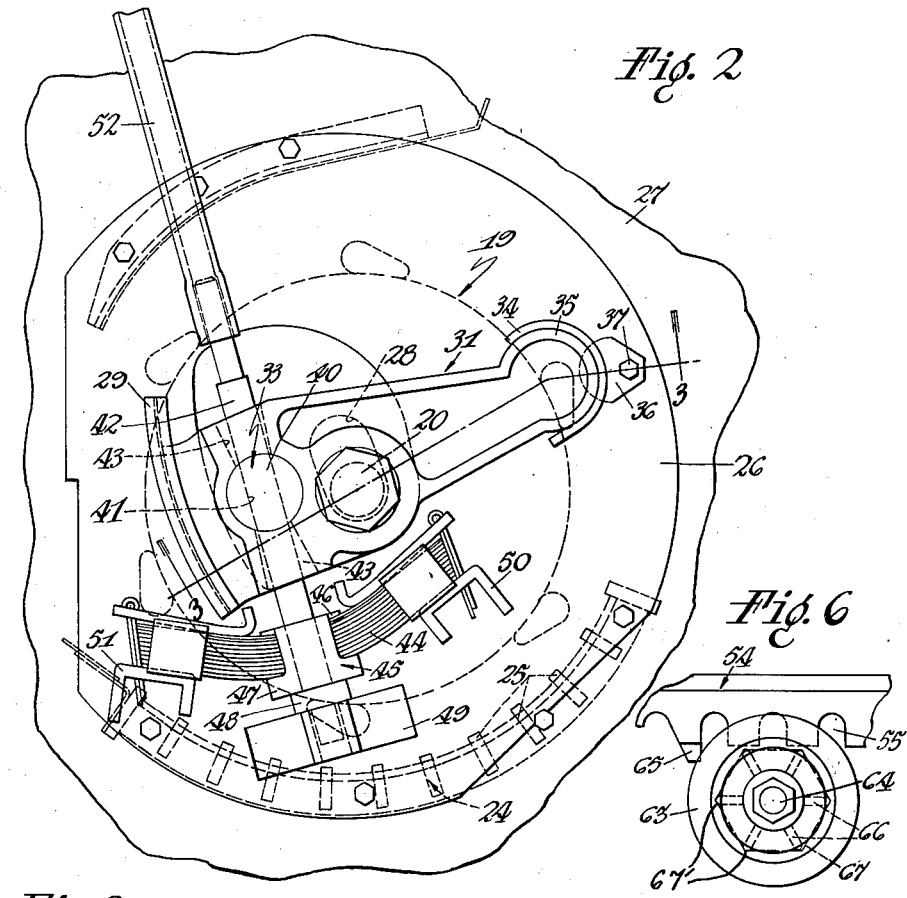
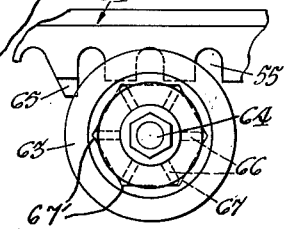
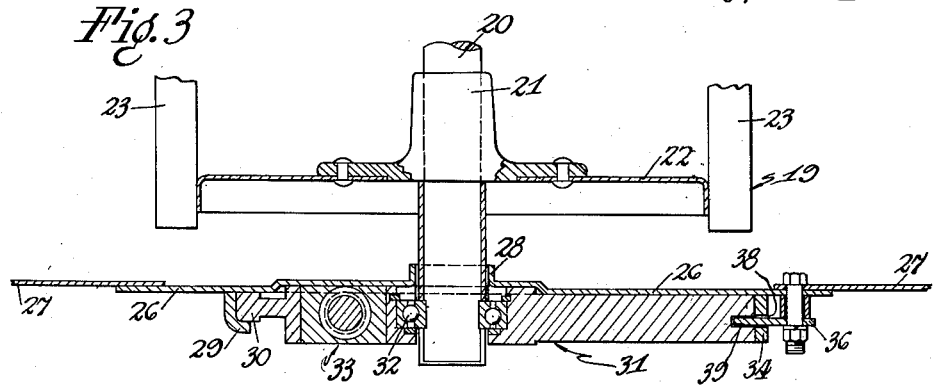
Inventors
Stuart D. Pool
Clinton D. Prosser Patented Sept. 25, 1951

2,569,193

UNITED STATES PATENT OFFICE 2,569,193

ADJUSTABLE SHAFT MOUNTING MEANS

Stuart D. Pool, Moline, and Clinton D. Prosser, Rock Island, Ill., assignors to International Harvester Company, a corporation of New Jersey Application May 31, 1946, Serial No. 673,450

3 Claims. (Cl. 308—61)

1

This invention relates to a new and improved yieldably mounted threshing cylinder and has for one of its principal objects the provision of means for permitting a threshing cylinder to yieldably rise with respect to its concave during operation of the threshing machine.

An important object of this invention is to provide a threshing cylinder adjustably positioned with respect to a concave and further to provide spring yielding means for permitting raising of the cylinder with respect to the concave regardless of the previous adjustment.

Another object of this invention is the provision of a threshing cylinder mounted on a pair of arms and adjustable with respect to a concave by rotation of the supporting arms.

A further important object is to provide a spring-mounted cylinder for a harvester thresher capable of accurate adjustment with respect to its concave at a position remote from the cylinder and adjacent the operator.

A still further object of this invention is the provision of a mounting for a harvester thresher threshing cylinder located entirely outside of the separator walls.

A still further object is to provide a threshing cylinder with easy and quick adjustment and one that will not clog due to increased amounts of material being threshed.

Other and further important objects of this invention will become apparent from the disclosures in the following specification and accompanying drawings, in which:

Figure 1 is a side elevational view of a portion of a self-propelled harvester thresher.

Figure 2 is a side elevational detail of the threshing cylinder mounting of this invention.

Figure 3 is a sectional view taken on the line 3—3 of Figure 2.

Figure 4 is an enlarged side elevational detail of the cylinder adjusting mechanism.

Figure 5 is a top plan view detail of a means for locking the adjusting mechanism.

Figure 6 is a side elevational view taken on the line 6—6 of Figure 4.

As shown in the drawings:

The reference numeral 10 indicates generally a self-propelled harvester thresher having a forwardly extending harvester part 11, a portion of which has been broken away, and a longitudinally extending thresher or separator housing 12. Large traction wheels 13 support the harvester thresher through the medium of an axle 14. Steerable wheels, not shown, are provided at the rear of the harvester thresher and are controlled

2 by a steering wheel 15 positioned substantially over the large traction wheels 13 on an operator's platform 16. A seat 17 is positioned slightly to the rear of the steering wheel 15, and brake and clutch pedals 18 project upwardly from the platform 16 within easy reach of the operator's feet.

In operation the harvester thresher is driven through a field of standing grain. The harvester part of the device cuts and lifts the grain to the separator 12 where the grain is separated from the husks and straw. Numerous elements are provided in the thresher for causing grain separation. One very important element is the threshing cylinder 19. As shown in Figures 2 and 3, the cylinder comprises a shaft 20, hub members 21, and spaced radially extending wheel-like members 22. These members positioned just inside the thresher are joined by a plurality of members 23 to act as rub bars in cooperation with a cylinder concave 24. The concave 24 consists of a plurality of spaced cross members 25 through which grain drops after removal from husks and straw.

Threshing cylinders must be adjusted within very close limits with respect to the cylinder concave in order to effectively cause grain separation. Further, different types of grain require greater or lesser spacing between the cylinder and concave. On many occasions slugs of material become clogged between the cylinder and concave often necessitating complete removal of the cylinder. Heretofore threshing cylinder adjustment was laborious. Numerous attempts have been made to facilitate cylinder adjustment, and in the past years some progress has been made toward this end. However, no one has heretofore been able to provide a readily adjustable cylinder and in combination with a means for permitting the cylinder to automatically open upon the passage of an excessive amount of material or when some foreign object is passed through the machine.

Particularly on a tractor-mounted harvester thresher it is quite essential that the cylinder be easily adjusted and readjusted. When the harvester thresher is mounted on a tractor, the elongated separator or thresher part runs parallel with an elongated tractor body and engine. Such positioning prevents access to one side of the thresher housing, and, as shown in Figure 1, the large traction wheel 13 partially obstructs access to a cover plate 26 enclosing the cylinder 19. Further, in addition to having a means for quickly and easily adjusting the position of the threshing cylinder, it is also essential that the effective width of the separator not be sacrificed in an effort to obtain this quick and easy adjustment. The space on a tractor between the body and relatively widely spaced traction wheels such as shown at 13 is limited, and hence the threshing separator must also be designed to fit within this limited space.

The threshing cylinder shaft 20 projects outwardly of separator side walls 27 through an elongated aperture 28 in the cover plate 26 as best shown in Figure 3. The cover plate 26 is provided with an arcuate track member 29 adapted to guide and confine one end 30 of an arm 31. The arm 31 carries the shaft 20 within a bearing 32 and is swingably adjustable by means of a trunnion 33 within a semi-circular track or guide member 34 attached to the cover plate 26 as shown in both of Figures 2 and 3. This guide member 34 is slightly greater than semi-circular so that the round end portion 35 of the arm 31 is maintained therewithin. A lock member 36 hinged at 37 to the cover plate 26 and side wall 27 of the separator is adapted to project within alined slots 38 and 39 in the semi-circular guide 34 and arm 31 respectively. This lock member 36 prevents axial displacement of the arm 31.

As best shown in Figure 2, the trunnion 33 consists of a circular member 40 journaled for rotation within the end 30 of the arm 31. This circular member 40 is provided with a transverse internally threaded aperture 41. A rod member 42 having external threads engages the internal threads 41 of the circular member 40. Inwardly tapered holes 43 on each side of the circular member 40 permit passage of the rod 42 through the entire arm 31. The fact that these holes 43 are outwardly flared permits greater rotational movement of the rod 42 with respect to the arm 31. The lower end of the rod 42 passes through a plurality of leaf springs 44 within a sleeve member 45 having flanges 46 and 47 to maintain the leaf springs 44 as a unit. A shoulder 48 on the rod 42 acts against the lower flange 47 of the sleeve 45 to lift the arm 31 by rotation of the rod 42 within the trunnion 33. This operation causes the threshing cylinder 19 to have its shaft 20 raised within the elongated slot 28. A stop member 49 limits downward movement of the rod 42 by reason of the shoulder 48 striking it, and thus the minimum space between the cylinder and concave is fixed.

The leaf springs 44 normally tend to maintain the cylinder in its lowermost position with respect to the concave 24. However, regardless of the threaded adjustment between the rod 42 and the circular member 40, the cylinder is permitted an upward swinging with the arms 31 by reason of the upward yielding of the leaf springs 44. Thus, if a slug of material or some foreign object should become lodged between the cylinder and the concave exerting a force greater than that which is normally imposed on the cylinder, the cylinder would act to bend the leaf springs 44 against their normal downwardly bowed position. As the spring 44 yields upwardly, the arm 31 is also raised through the medium of the rod 42 thus increasing the distance between the cylinder and concave and permitting the slug of material or foreign object to pass therethrough without causing damage to any of the elements and further without causing work stoppage. The leaf springs 44 are fixed to the cover plate 26 at their two ends by bracket members 50 and 51.

In order to effect a convenient turning of the rod 42, an extension 52 is provided which extends upwardly to a position adjacent the seat of the operator and within easy reach of the operator's hand. A bracket 53 fixed to the separator housing 12 supports and guides the extension 52. A hand wheel 54 is provided at the top of the extension 52, and rotation thereof will cause rotation of the extension 52 and in turn cause rotation of the rod 42 which directly raises and lowers the arm 31. It will be obvious that the cylinder 19 is adjustable at both ends or at both sides of the thresher housing 12. The cylinder is usually positioned parallel to the concave. However, this need not be the case, and if it is desired to incline the threshing cylinder the machine will operate with one arm 31 at a different position from that of the other arm 31. The hand wheel 54 is provided with a series of notches or scallops 55 around the under annular surface. Fixedly attached to the bracket 53 is an arm 56 carrying guide members 57 and 58. A locking pin 59 is adapted to axially slide through alined apertures in these guide members 57 and 58. A hand portion 60 in the form of a U-shaped loop positioned between the guide members 57 and 58 permits sliding of the locking member 59 from an inoperative position to a position within one of the notches 55 on the hand wheel 54. When the pin 59 is in contact with one of the notches 55, the hand wheel 54 is prevented from rotating. When the pin is withdrawn from its position within one of the notches 55, the hand wheel 54 is again permitted full rotation. Provision is made to maintain the locking pin 59 out of engaging relationship with the hand wheel 54 by a bracket 61 attached to the tubular member 56. A bent-over end portion 62 of the locking pin 59 is adapted to engage the bracket 61 as shown in the dashed line position of the locking pin in Figure 5, in which position the hand wheel 54 is free to rotate or the handle 60 of the locking pin 59 may be rotated so that the bent end 62 clears the bracket 61 and the locking pin is moved down into its full-line position as shown in Figure 5, in which position the hand wheel is locked against further rotation.

The upper face of the hand wheel 54 is preferably equipped with a scale calibrated to move the threshing cylinder a predetermined amount upon each revolution or part of a revolution of the hand lever. If it is desired, this calibration may be in thousandths of an inch, and in order that the position of the cylinder be known at all times a counting wheel 63 is journaled in an upper extension of the bracket 53 at 64 and is positioned at right angles to the hand wheel 54. A single lug 65 depends downwardly from the periphery of the hand wheel 54 and is adapted to engage teeth 66 on a rearward extension of the counting wheel 63. Hence it will be understood that one full revolution of the hand wheel 54 will rotate the counting wheel 63 one unit determined by the spacing of the teeth 66. A collar 67, hexagonal in shape so that the number of sides equals the number of teeth 66, integral with the counting wheel 63 and the teeth 66 is positioned closely beneath the hand wheel 54. The flat sides of the hexagonal collar 67 prevent the counting wheel from turning except when the hand wheel is turned. As the hand wheel 54 is rotated the long lug 65 strikes one of the six teeth 66 and the apices 67' of the hexagonal collar turn up within the notches 55. This hexagonal collar serves to prevent the counting wheel 63 from becoming accidentally rotated without rotation of the hand wheel. The face of the counting wheel 63 will be scaled and calibrated to coordinate the calibrated movements of hand wheel 54, and thus the position of the threshing cylinder with respect to the concave will be apparent at all times.

In operating the harvester thresher of this invention, the threshing cylinder will automatically take care of itself and will yield when foreign objects or large slugs of material pass through to the separator. Further, when the operator is aware that grain in certain portions of a field requires closer or wider spacing of the cylinder with respect to the concave, the hand wheel 54 is moved in the proper direction to effect a raising or lowering of the cylinder. The yieldable nature of the cylinder provides a safety factor heretofore unknown in harvester thresher construction, and, further, the convenient adjustment of the cylinder with respect to the concave is also a very desirable feature.

Numerous details of construction may be varied throughout a wide range without departing from the principles disclosed herein, and we therefore do not propose limiting the patent granted hereon otherwise than as necessitated by the appended claims.

What is claimed is:

1. In a device for adjustably mounting a shaft in a housing, said device including arms hingedly mounted on said housing, said arms carrying the shaft, and means for raising and lowering said arms, said means including trunnions in said arms and threaded spindles engaging said trunnions, each said threaded spindle yieldably anchored at its lower end and journally supported at its upper end whereby the shaft may yield upwardly regardless of the setting of the threaded spindle in the trunnion.

2. In a shaft mounting device having a housing, guide brackets affixed to the outside of said housing, arms adapted to slidably and hingedly rotate within said guide brackets, means associating a shaft with said arms, said guide brackets forming tracks for the ends of the arms, one end of each of said arms being substantially a full circle and the other end of each of said arms being arcuate in shape and less than a semicircle, and said guide brackets having their tracks shaped to conform to the shapes of the respective arm ends.

3. In a shaft mounting device having a housing, guide brackets affixed to the outside of said housing, arms adapted to slidably and hingedly rotate within said guide brackets, means associating a shaft with said arms, said means including a journaling of said shaft for rotation in said arms, trunnions on each of said arms, and rods having threaded portions engaging said trunnions and adapted to raise or lower said arms by rotation of said rods, said rods yieldably anchored by leaf springs at their lower ends.

STUART D. POOL.
CLINTON D. PROSSER.

REFERENCES CITED

The following references are of record in the file of this patent:

UNITED STATES PATENTS

| Number | Name | Date |
| --- | --- | --- |
| 881,287 | Baker | Mar. 10, 1908 |
| 1,172,011 | Cooper | Feb. 15, 1916 |
| 1,362,163 | Burden | Dec. 14, 1920 |
| 1,405,692 | Starnes et al. | Feb. 7, 1922 |
| 1,489,695 | Burns et al. | Apr. 8, 1924 |
| 1,857,265 | Stephens | May 10, 1932 |
| 2,080,364 | Tunley | May 11, 1937 |
| 2,114,660 | Thalmann | Apr. 19, 1938 |
| 2,168,383 | Baker | Aug. 8, 1939 |
| 2,222,987 | Perry | Nov. 26, 1940 |
| 2,310,282 | Gauss | Feb. 9, 1943 |
| 2,318,188 | Anderson et al. | May 4, 1943 |
| 2,354,264 | Hitchcock | July 25, 1944 |
| 2,376,618 | Paradise et al. | May 22, 1945 |
| 2,470,582 | Seasongood | May 17, 1949 |

FOREIGN PATENTS

| Number | Country | Date |
| --- | --- | --- |
| 26,917 | Germany | May 14, 1884 |
| 843,383 | France | Mar. 27, 1939 |